United States Patent [19]

Stevens, Jr. et al.

[11] Patent Number: 4,642,660

[45] Date of Patent: Feb. 10, 1987

[54] ROTARY DRUM NON-IMPACT PRINTER

[75] Inventors: Gerald S. Stevens, Jr., Forest Hill; Thomas P. Sapitowicz, Bel Air, both of Md.; Edward D. Davis, Stewartstown, Pa.

[73] Assignee: General Instrument Corporation, New York, N.Y.

[21] Appl. No.: 813,380

[22] Filed: Dec. 26, 1985

[51] Int. Cl.⁴ .............................................. G01D 15/18

[52] U.S. Cl. .................................... 346/140 R; 346/75

[58] Field of Search .............................. 346/75, 140 R

[56] References Cited

U.S. PATENT DOCUMENTS 3,864,685 2/1975 Fischbeck ........................ 346/140 R 4,308,543 12/1981 Shultz .................................. 346/75

*Primary Examiner*—E. A. Goldberg

*Assistant Examiner*—Gerald E. Preston

*Attorney, Agent, or Firm*—James & Franklin

[57] ABSTRACT

Sets of radially mounted solid ink spark jet capsules are situated around the circumference of a cylindrical drum rotated at high speed. A commutation disc, mounted on one end of the drum, has a surface with spaced concentric conductive strips. Each strip corresponds to a different one of the capsules in each of the sets. The strips are divided into arcuate sections, one section for each set. The sections are aligned in groups. A line of stationary contacts, one for each of the strips, energize sections in the group aligned therewith when connected through electrical switches to a pulsed high voltage source. The mechanical commutator significantly reduces the number of electrical switches required. A single motor rotates the drum, as well as print speed and slew speed capstans.

27 Claims, 7 Drawing Figures

FIG. 4
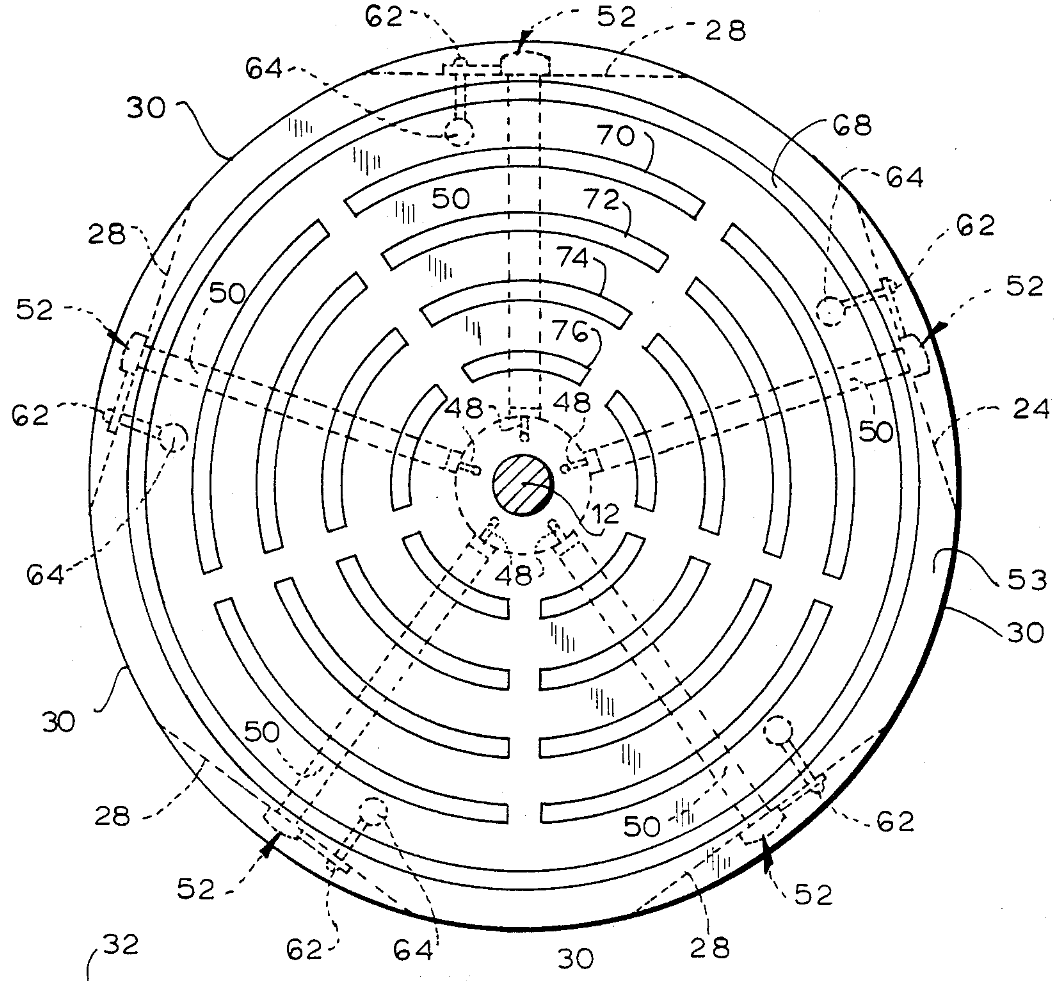
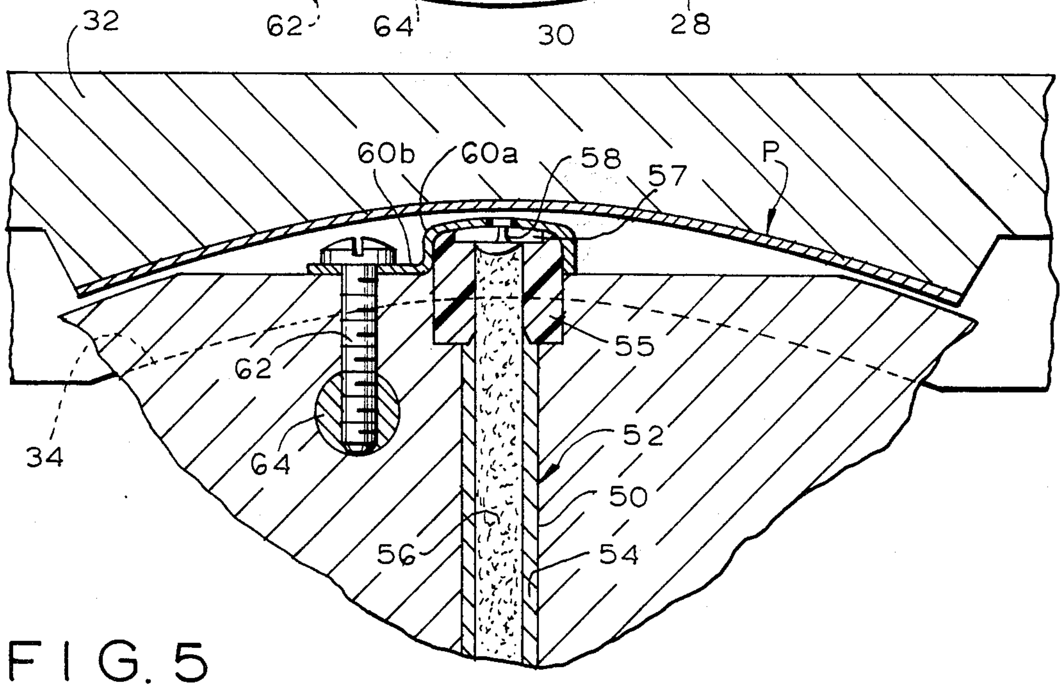
FIG. 5

ROTARY DRUM NON-IMPACT PRINTER

The present invention relates to dot matrix printer used for the printing of tickets or receipts such as employed in lotteries, parimutuel wagering, and the like and, more particularly, to a rotary drum non-impact printer which can be operated at high speed with excellent print quality and which requires only a limited number of electrical switching devices.

One type of printer which has been used in the past in ticket processors is known as an "impact" printer. An impact printer is designed to print a matrix of dots by causing the impact end of the print wire to be displaced toward an ink ribbon situated between the wire and the ticket. A plurality of such print wires, normally situated along a straight line extending transverse to the ticket movement, are often utilized. Each of the print wires is connected to an actuator. In the past, such actuators took the form of electrically actuatable solenoids. However, because of the weight, bulk, and cost of solenoids, same have recently been replaced, in many applications, by thin hammer-type actuators.

The hammer-type actuators normally comprise a stamped thin metal part having an opening into which a flat wire coil is mounted. The actuators are mounted in a closely packed side-by-side manner, in cantilever fashion, between a pair of strong permanent magnets. Energization of the coil in a particular actuator causes the actuator, and thus the print wire attached thereto, to be displaced from its rest position toward the ticket, thereby to print a dot. By rapidly energizing the individual actuators and synchronizing same with the movement of the ticket, the appropriate indicia can be imprinted.

Recent developments in non-impact printing have resulted in dot matrix printers of commercial quality. Such non-impact printers eliminate some of the problems associated with impact printers because they require no displaceable actuators within the print head. Consequently, high manufacturing tolerances are no longer required and precise alignment of mechanically moving hammers no longer necessary.

Non-impact printing devices are described in U.S. Pat. No. 4,349,829 entitled "Non-Impact Printing Method" issued to Michelle Bovio, et al on Sept. 14, 1982; U.S. Pat. No. 4,332,487 entitled "Solid Ink Cartridge For Non-Impact Printer" issued to Michelle Bovio, et al on June 1, 1982; and U.S. Pat. No. 4,238,807 entitled "Non-Impact Printing Device" issued to Michelle Bovio, et al on Dec. 9, 1980. These patents describe a non-impact print capsule with selective emission of solid ink particles. A rod of solid ink is pressed by a spring in an insulating housing against the end wall with a nozzle therein. A pulsed, high voltage applied between the ink rod and a counter electrode (located proximate the nozzle end) causes ink particles to be eroded from the solid rod and ejected through the nozzle onto the paper. The paper and printing device are moved relative to each other such that selective control of the high voltage pulsing can be used to form characters by a dot matrix technique.

Such spark jet print capsules have been incorporated in serial dot printers, as described in U.S. Pat. No. 4,349,829 referred to above. In this case, a single line of spark jet print capsules is mounted on a carriage movable transversely with respect to the paper, in a reciprocating motion. This device is somewhat similar to the shuttle-type impact printers known in the art in that the adverse effects of inertia are introduced.

Printers employing a plurality of spark jet capsules require electrical commutation devices to selectively connect the capsules to a source of high voltage, usually a pulsed DC source of approximately 4000 volts. Such commutation devices normally take the form of a plurality of high voltage electronically controlled electrical switching devices, one of which is required for each capsule. Such switching devices tend to be relatively large and expensive.

The non-impact printer of the present invention utilizes a mechanical commutation device to significantly reduce the number of electrical switching devices required and eliminates the adverse effects of inertia caused by rapidly reciprocating a line of capsules through the use of a high-speed rotating drum, which carries the mechanical commutator disc. The drum has a plurality of sets of spark jet capsules radially mounted at spaced locations along its circumference. The commutator disc, rotated with the drum, has concentrical conductive strips on its surface. The outer strip is a "common" strip and is undivided. The other strips, one for each capsule in each set, are divided in arcuate sections. Groups of sections corresponding to the capsules in each set are aligned radially. A line of stationary brushless contacts operably connect the sections in the group aligned therewith to the output of a pulsed high voltage source, through a limited number of electrical switching devices. The number of switching devices required is equal to the number of capsules in each set, instead of the total number of capsules, as in prior art devices.

The printer is simplified by using a single motor to rotate the drum as well as the print speed capstan and slew speed capstan. Each capstan is connected to the motor through appropriate gearing. Separately actuatable solenoids position pressure rollers aligned with the capstans to control the speed of the paper.

It is, therefore, a prime object of the present invention to provide a non-impact printer which employs a rapidly rotating cylindrical member having a plurality of solid ink spark jet capsules radially mounted thereon.

It is another object of the present invention to provide a rotary drum non-impact printer which utilizes a mechanical commutation device to greatly reduce the number of electronic switching devices required.

It is another object of the present invention to provide a rotary drum non-impact printer wherein the mechanical commutation device is rotated along with the drum and includes a plurality of concentric conductive strips, corresponding to the capsules in each set.

It is another object of the present invention to provide a rotary drum non-impact printer wherein the conductive strips on the commutator disc are divided into sections, the sections being radially aligned in groups to correspond to the different capsule sets.

It is another object of the present invention to provide a rotary drum non-impact printer wherein a single motor is utilized to drive the drum and, through the appropriate gearing, the print speed capstan and slew speed capstan.

In accordance with the present invention, a print head is provided comprising a generally cylindrical member. A plurality of electrically actuatable spark jet capsules are radially mounted in the member. Means are provided for rotating the member. Electrical source means are provided. Mechanical means, movable with said member, are provided for operably electrically connecting the source to actuate selected ones of the capsules, as the member is rotated.

The mechanical connecting means comprises a movable part having a conductive portion and contact means. The contact means are conditionally connectable to the source. The part is movable relative to the contact means between a non-aligned position and an aligned position. The contact means, when connected to the source, operably connects the source to the conductive portion, when same is aligned therewith.

The movable part is preferably in the form of a disc. The disc is mounted for rotation with the member. The conductive portion is a circular conductive strip on the surface of the disc.

The plurality of capsules are divided into sets. The sets are positioned at spaced locations around the circumference of the member.

The conductive portion preferably comprises a plurality of spaced, concentric conductive strips, divided into arcuate sections. The conductive strips correspond to the capsules in each of the sets.

Groups of arcuate sections of the conductive strips are preferably radially aligned. Each group of radially aligned arcuate sections corresponds to a different one of the sets of capsules.

Means are provided for driving a paper strip proximate the circumferential surface of the member. The driving means preferably comprises a first capstan and a second capstan. The first capstan is adapted to move the paper strip at a first speed and the second capstan is adapted to move the paper strip at a second speed.

First and second pressure rollers are provided which are movable to a given position to cooperate with the first and second capstans, respectively, to move the paper strip. Means are provided for moving a selected one of the first and second pressure rollers to the given position. The rotating means drives the first and second capstans, as well as the member.

The electrical source means comprises a high voltage source and means for pulsing the output of the source. Means are provided for synchronizing the pulsing means with the rotation of the member.

The electrical source means has first and second outputs. One of the outputs is electrically connected to a common terminal means mounted on the circumferential surface of the member proximate the print end of each of said capsules.

A common conductive portion, situated on the disc surface, is connected to the common terminal means. The common conductive portion is preferably the outermost conductive strip. The outermost conductive strip is undivided so that it aligns with the contact means at all rotational positions of the member.

The member preferably comprises a drum having five sets of capsules, including four capsules each. The connecting means preferably comprises a disc with four spaced circular conductive strips concentrically arranged on the surface thereof, each strip being divided into five sections. An additional circular conductive strip, preferably the outermost, functions as a common conductor.

Five contacts, preferably of the brushless type, are each positioned proximate to a different one of the circular strips. The strip sections are radially aligned in groups, one group for each of the five sets. The contacts align with the different groups of sections as the drum rotates.

One of the contacts is the "common" contact. The common contact is connected to one output of the high voltage source. The common contact aligns with the outermost strip at all rotational positions of the drum.

Separate means, in the form of electrical switching devices, are provided for selectively electrically connecting each of the contacts (except the common contact) with the source means. Only four electrical switching devices are required to operate all twenty capsules, one for each capsule in the sets.

To these and to such other objects which may hereinafter appear, the present invention relates to a rotary drum non-impact printer, as described in detail in the following specification, and recited in the annexed claims, taken together with the accompanying drawings, wherein like numerals refer to like parts and in which:

FIG. 4 is an end view of the commutation disc and drum of the rotary drum non-impact printer of the present invention;

FIG. 5 is an enlarged fragmentary view of a section of the drum of the rotary drum non-impact printer of the present invention;

Figure 1:
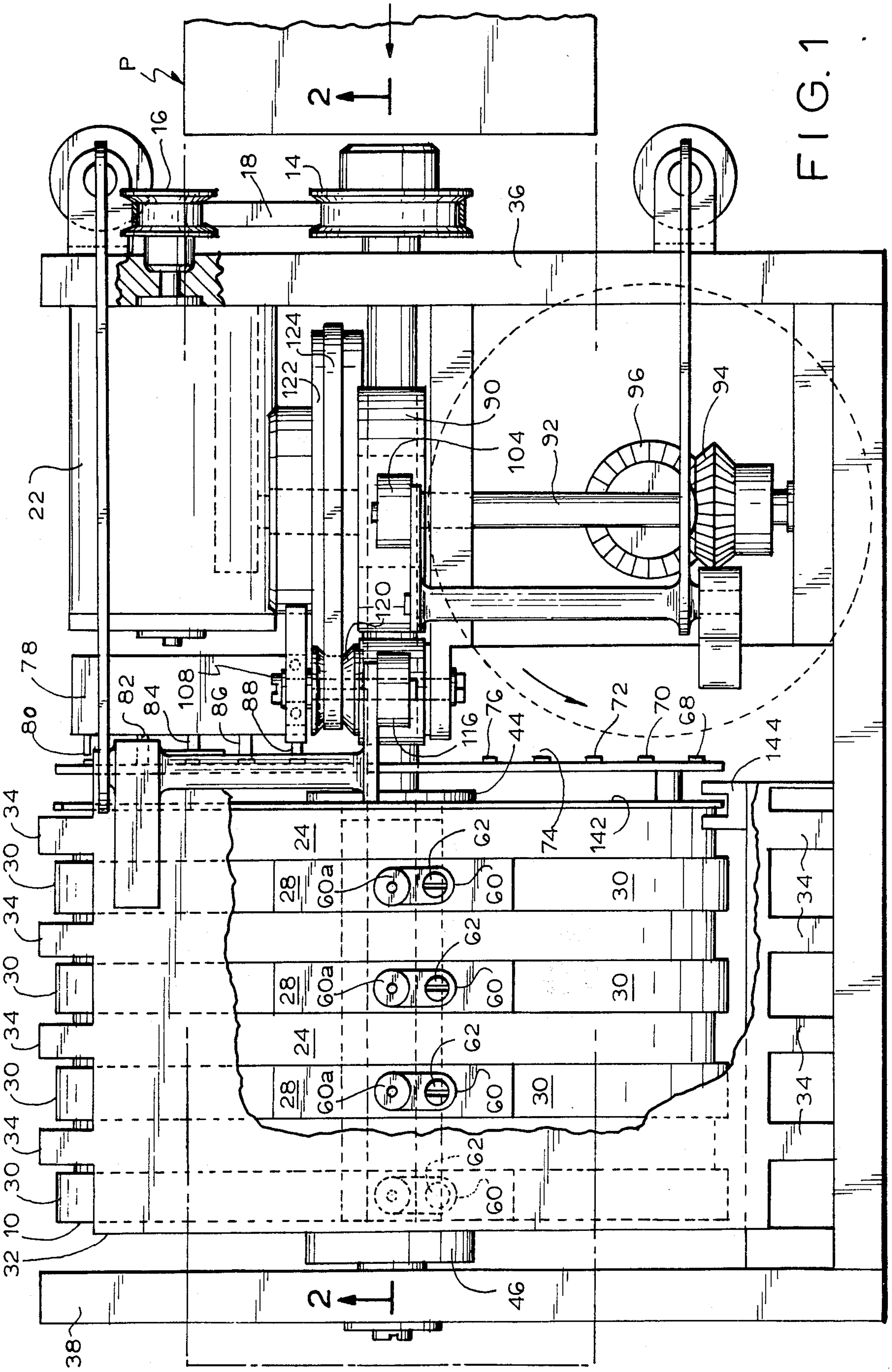
FIG. 1 is a top plan view of the rotary drum non-impact printer of the present invention.

As seen in the drawings, the rotary drum non-impact printer of the present invention includes a generally cylindrical member or drum 10 mounted for rotation on a shaft 12. Shaft 12, proximate one end, carries a pulley 14. Pulley 14 is connected to a second pulley 16 by a belt 18. Pulley 16 is mounted on the output shaft 20 of a DC motor 22. Motor 22 rotates drum 10 at a very high speed, preferably 2600 revolutions per minute.

The surface of drum 10 has a plurality of generally circular recessed surface portions 24 and a plurality of protruding surface portions 26 which alternate with recessed portions 24. Each of the protruding portions 26 appears in front view like a circle with five arcuate peripheral sections removed, such that it consists of five substantially planar sections 28 spaced around the circumference, with arcuate sections 30 therebetween.

Figure 3:
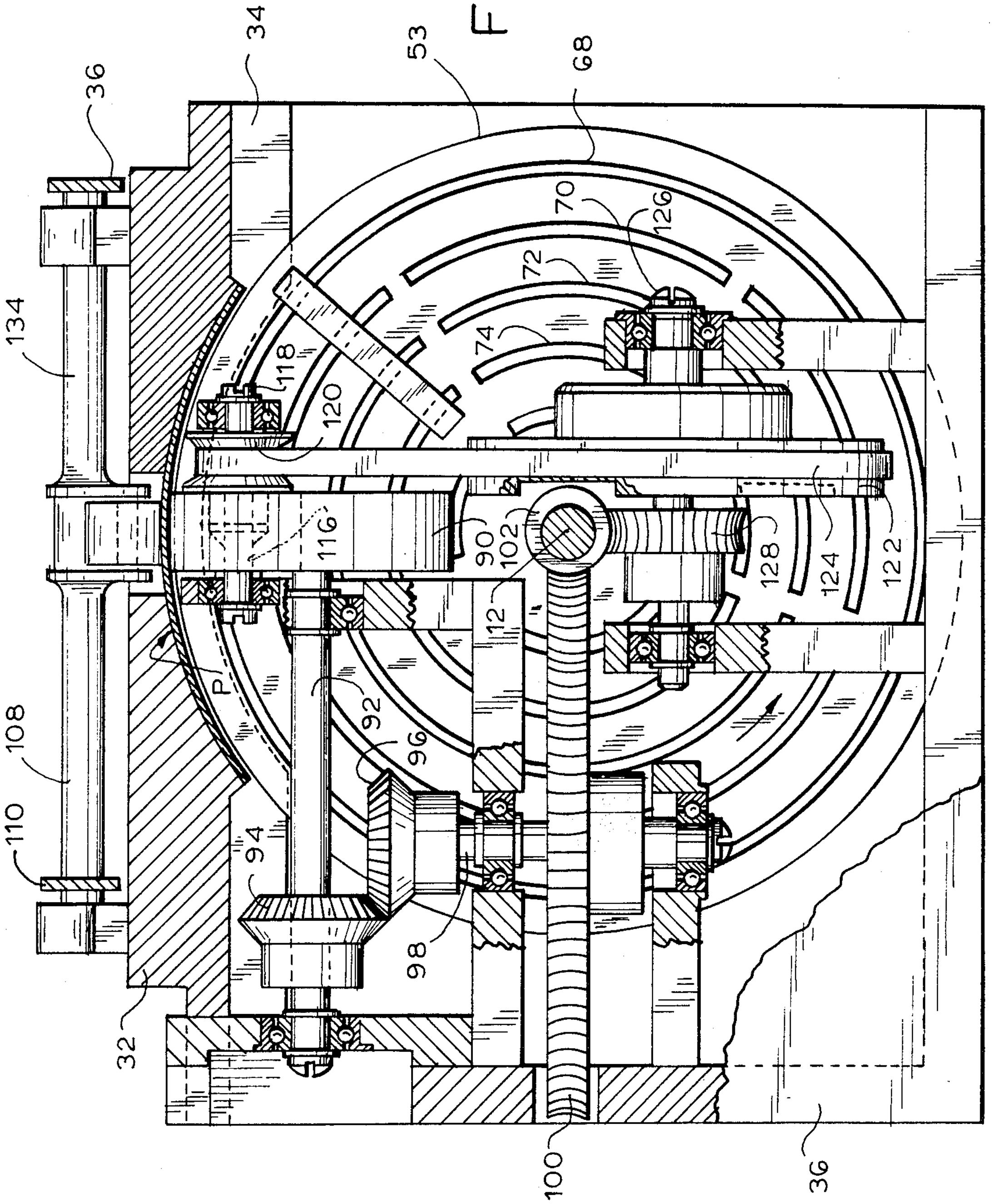
FIG. 3 is an end cross-sectional view of the rotary drum non-impact printer of the present invention, taken along line 3—3 of FIG. 2.
Figure 6:
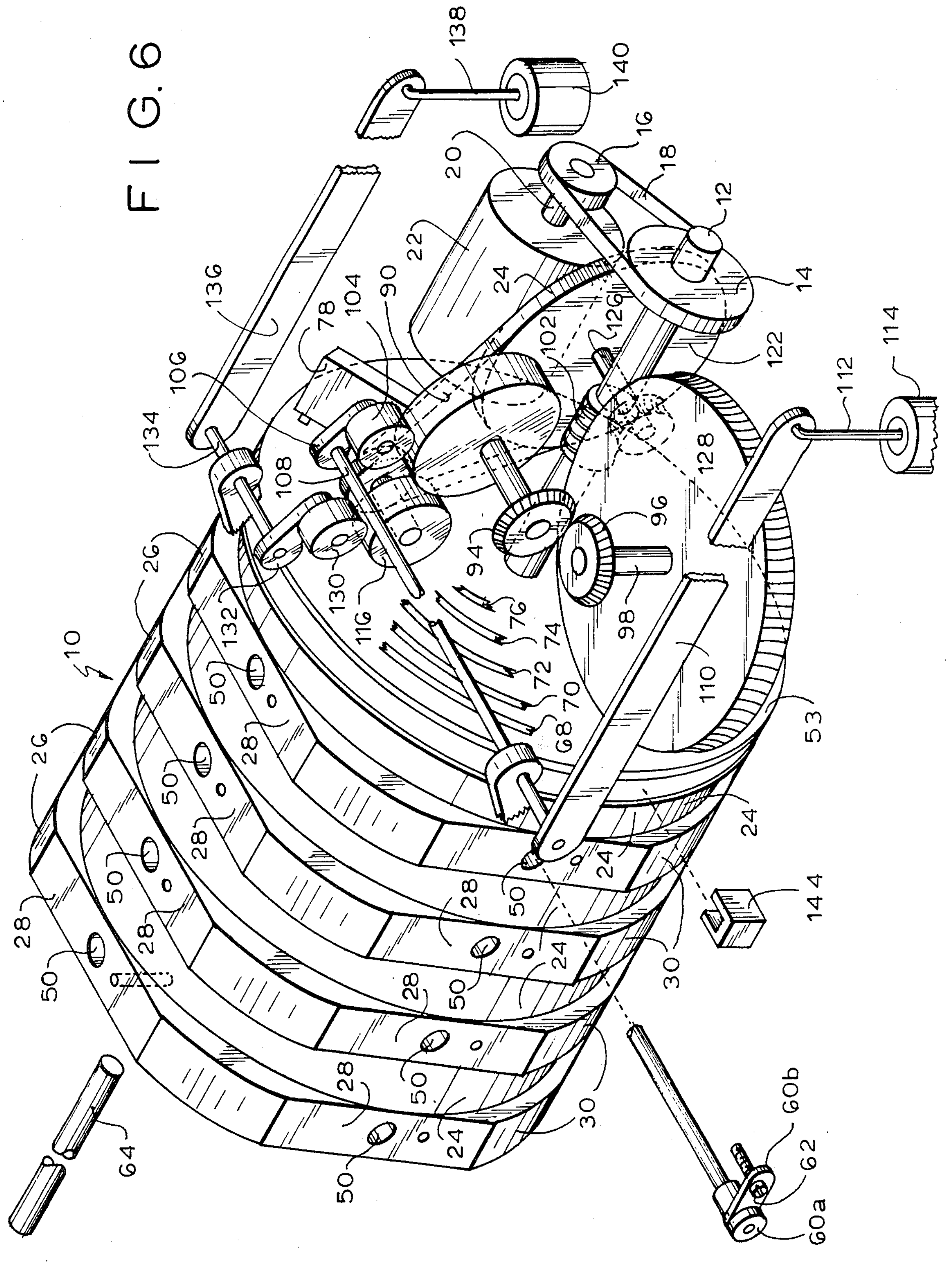
FIG. 6 is an isometric view of the rotary drum non-impact printer of the present invention.

A strip of paper P is driven along the top of drum 10, in a manner described in detail below. As best seen in FIGS. 3 and 5, the paper P, when viewed endwise, is held in an arcuate condition as it moves along the drum. The paper P is positioned such that there is a small gap (FIG. 5) between the lower surface of the paper P and the upper surface of the electrode proximate the nozzle end of the solid ink spark jet capsules, described in detail below.

Paper P is retained between the lower concave surface of a stationary upper guide element 32 and the upper convex surfaces of a plurality of spaced stationary lower bridge elements 34, which have an arcuate shape. The upper surfaces of elements 34 lie in substantially the same curved plane as the curved plane through which arcuate sections 30 of guide portions 26 move as drum 10 is rotated.

Figure 2:
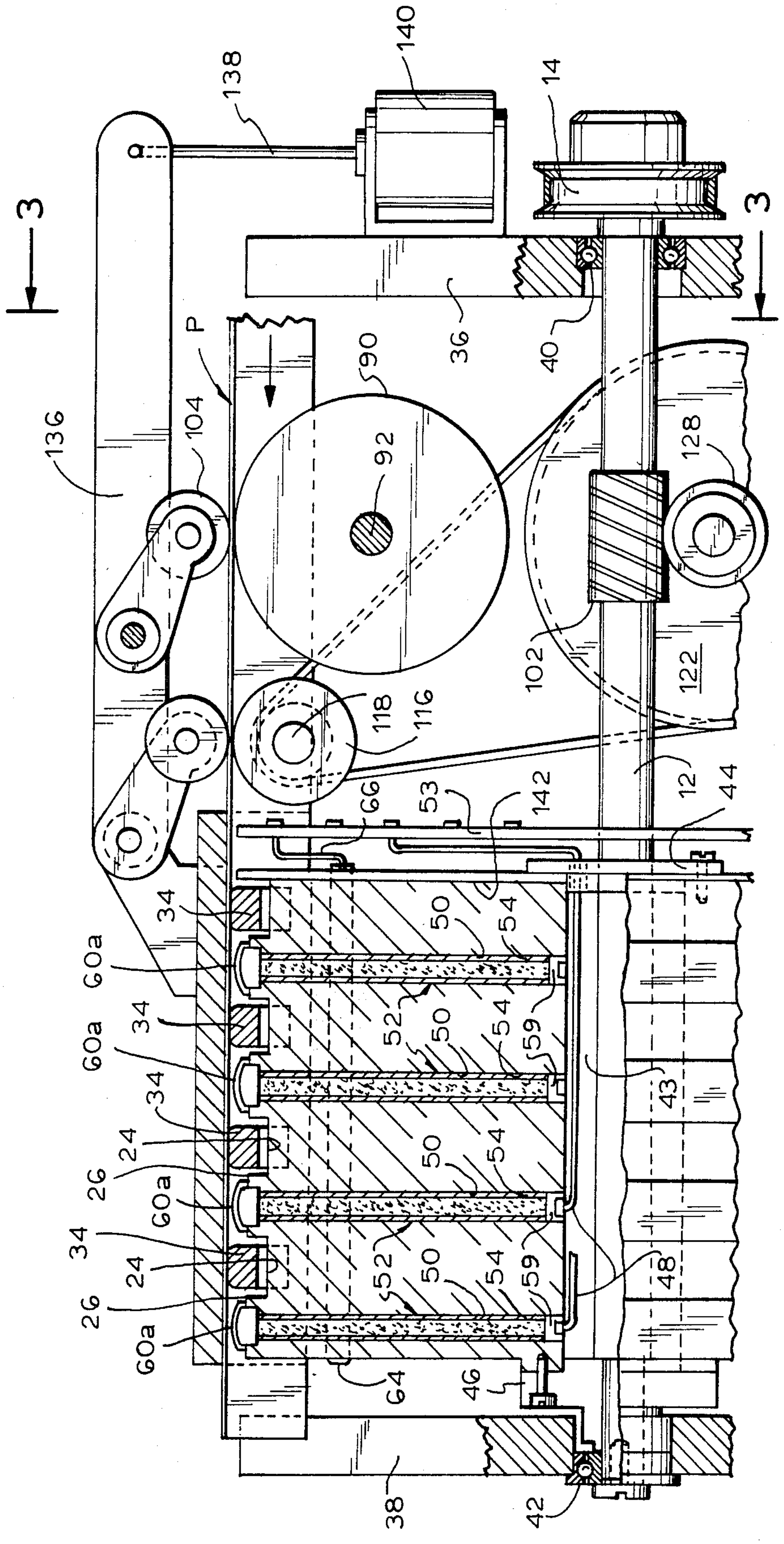
FIG. 2 is a side cross-sectional view of the rotary drum non-impact printer of the present invention, taken along line 2—2 of FIG. 1.

Both elements 32 and 34 are mounted on the frame adjacent the drum and extend across the top of the drum. Upper guide element 32 lies over the entire top of the drum. Lower bridge elements 34 are situated within the recesses between protruding portions 26 of the drum and align with each of the recessed portions 24, as best seen in FIG. 2. The lower surfaces of lower bridge elements 34 are concave and spaced a short distance from the surfaces of portions 24 to provide sufficient clearance therebetween.

As drum 10 is rotated, paper P is retained securely between the elements 32 and 34 as the paper is moved over the top of the drum in a direction parallel to the axis of the drum. In order to permit free rotation of the drum, a small gap is maintained between the drum and the paper. As the drum is rotated, ink particles are emitted from the capsules on the drum and travel across this gap to the paper.

As best seen in FIG. 2, shaft 12 is rotatably mounted between a stationary frame members 36 and 38, located at the ends of the print head. Shaft 12 is mounted to frame sections 36 and 38 by bearings 40, 42 to permit free rotation thereof. Drum 10 is fixedly mounted on shaft 12 by end plates 44, 46. The mid-section 43 of drum 10, extending between plates 44 and 46, through which shaft 12 extends, is hollow and larger in diameter than the outer diameter of shaft 12. A plurality of leads 48 extend from the interior end of each of a plurality of radially extending, generally cylindrical bores 50, through mid-section 43 and openings in an end plate 44 to the rear surface of a commutation disc 53, fixedly mounted on drum 10. Disc 53 is spaced a short distance from the drum along shaft 12.

Cylindrical bores 50 are arranged in five sets, each set including four bores aligned along the axis of the drum. Each of the bores extends from the hollow mid-section 43 of drum 10 to the circumference thereof and terminates at the center of a different one of the flat sections 28 of protruding portions 26. Each of the bores 50 is adapted to receive a solid ink spark jet capsule of the type referred to above.

As seen in FIG. 5, each capsule 52 includes a conductive casing 54 which surrounds a cylindrical conductive solid ink rod 56 which is spring-loaded towards the non-conductive outer nozzle end 57 of the capsule which has an orifice 58 therein. The nozzle end 57 is located in the outer end of insulator 55. Insulator 55 prevents electrical connection between electrode 60 and conductive casing 54. A spring (not shown) of conductive material is interposed between the lower end of the ink rod 56 and an electrode 59 which forms the bottom of the casing 54. Each electrode 59 is connected to one of the leads 48. Alternately the capsule 52 may also function without the use of a spring load by using the centrifugal forçe caused by drum rotation to load the ink rod 56 towards the nozzle end.

Above the nozzle end of each capsule is situated a second electrode 60 which has an opening therein aligned with orifice 58. As best seen in FIG. 5, electrode 60 includes a cap-like portion 60*a*, which covers the nozzle end of the capsule, and a mounting portion 60*b* which is affixed to the surface of section 28 of drum 10 by means of a conductive screw 62. All of the screws 62 associated with each set of aligned capsules 52 are in electrical contact with a different electrically conductive common rod 64. Five rods 64 are provided in the interior of the drum. Each of the rods 64 extend in a direction which is parallel to shaft 12. All of the rods 64 are connected by a single lead 66 to the rear surface of commutation disc 53.

The front surface of commutation disc 53, as best seen in FIG. 4, has five circular concentric conductive strips 68, 70, 72, 74 and 76. Located at a position spaced from the surface of disc 53 is a contact block 78 which includes five "brushless" contacts 80, 82, 84, 86 and 88. Contacts 80, 82, 84, 86 and 88 extend towards and are aligned with each of conductive strips 68, 70, 72, 74 and 76, respectively.

Conductive strip 68 is the common strip. It is undivided and connected to lead 66. Because it is undivided, it aligns with contact 80 at all rotational positions of drum 10. Strip 68 is always connected, via contact 80, with one output of the high voltage source which actuates the capsules.

Each of the other strips 70, 72, 74 and 76, are divided into five arcuate sections. Each of these arcuate sections correspond to one of the capsules 52 in each aligned capsule set and is connected thereto by means of a lead 48. The arcuate sections are radially aligned in groups of four sections each such that the arcuate sections connected to the capsules 52 in each set will all align with the contacts 82, 84, 86 and 88 during a given rotational position of drum 10.

By appropriately energizing selected contacts 82, 84, 86, 88, the capsules in a given set connected to the aligned conductive sections are actuated to emit ink particles. Contacts 82, 84, 86 and 88 are situated such that they will align with the particular group of arcuate conductive strip sections electrically connected by leads 48 to the set of capsules 52 which are proximate with paper P, due to the rotational position of the drum.

Paper P is moved along drum 10 by a print speed capstan 90 at approximately three inches per second. Capstan 90 is mounted on a shaft 92 which carries a first bevel gear 94. Bevel gear 94 meshes with a second bevel gear 96 which is carried on a shaft 98 to which a large gear 100 is mounted. Gear 100, in turn, meshes with a worm gear 102 fixedly mounted on shaft 12.

Print speed capstan 90 cooperates with a pressure roller 104 which is carried by a bracket 106 on the end of the rotatable shaft 108. Shaft 108 rotates through an arc such that roller 104 is moved between a position proximate capstan 90 and a position spaced from capstan 90. The other end of rotatable shaft 108 is connected to an arm 110, the opposite end of which is connected to a retractable piston rod 112 of a conventional electrically actuated solenoid 114.

When solenoid 114 is actuated, rod 112 is retracted, moving arm 110 in a clockwise direction so as to rotate rod 108 and move pressure roller 104 to a position proximate the print speed capstan 90. When solenoid 114 is not actuated, an internal spring causes rod 112 to extend, moving arm 110 and rod 108 in a counterclockwise direction, such that roller 104 is remote from capstan 90. Accordingly, the actuation of solenoid 114 controls whether paper P is driven by print speed capstan 90 or not.

In between printing operations, it is desirable to move the paper P at a higher (slew) speed as compared to the print speed. Preferably, the slew speed is 30 inches per second. In order to achieve this, a slew speed capstan 116 is provided. The slew speed capstan 116 is mounted on a shaft 118, the other end of which carries a pulley 120. Pulley 120 is connected to a large pulley 122 by a timing belt 124. Large pulley 122 is mounted on a shaft 126, the other end of which carries a gear 128 which meshes with worm gear 102.

A pressure roller 130 is mounted on a bracket 132 so as to be movable between a position adjacent slew speed capstan 116 and a position remote therefrom. Bracket 132 is mounted on one end of a rod 134, the other end of which is mounted to one end of arm 136. The other end of arm 136 is connected to the retractable piston rod 138 of an electrically actuated solenoid 140.

When solenoid 140 is actuated, piston rod 138 is retracted, moving arm 136 in a clockwise direction such that pressure roller 130 is moved to a position proximate the slew speed capstan 116. When solenoid 140 is not actuated, an internal spring extends rod 138, moving arm 136 and rod 134 in a counterclockwise direction, and thus roller 130, to a position remote from capstan 116.

It will now be appreciated that by selectively actuating solenoids 114 and 140, the speed of paper P relative to head 10 can be changed from the slower print speed, employed during the print operation, to the faster slew speed, employed between print operations. Both the slew speed capstan 130 and the print speed capstan 116 are indirectly driven from worm gear 102 which is mounted on drum shaft 12. Hence, the drum 10 and both capstans 116 and 130 are driven from a single motor 22.

Situated on the end of drum 10, facing disc 53, is a strobe disc 142 which, as best seen in FIG. 1, cooperates with a photosensitive signal generating means 144 of conventional design. The signal output of photosensitive signal generating means 144 is utilized to synchronize the actuation of the spark jet capsules 52 with the position of the rotating drum.

Figure 7:
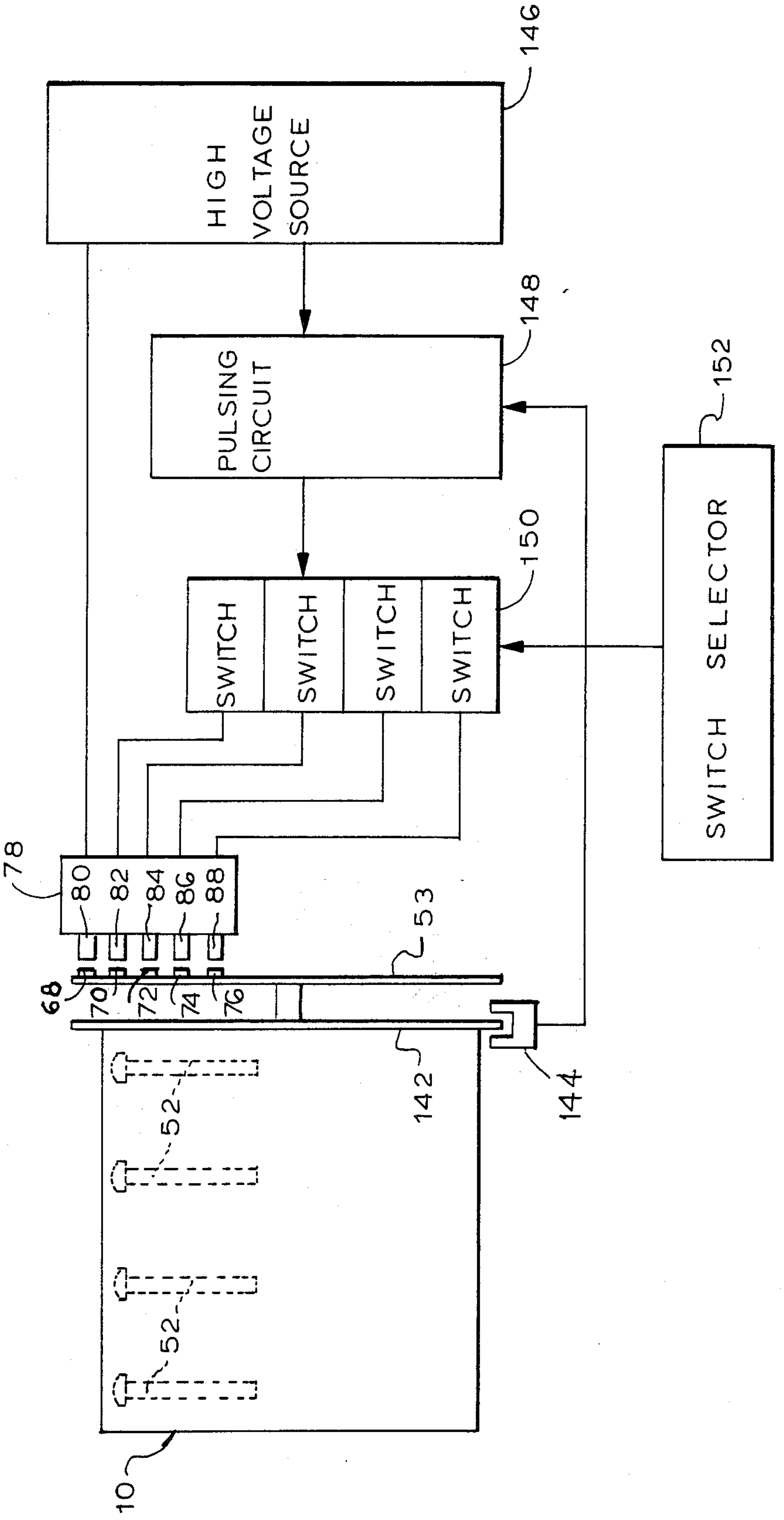
FIG. 7 is a block diagram of the energizing circuitry of the rotary drum non-impact printer of the present invention.

More specifically, as shown in FIG. 7, the high voltage source 146 has one output which is directly connected to contact 80 in block 78 which, in turn, is connected to conductive strip 68 on disc 53 and to all of the common electrodes 60 on the surface of drum 10 proximate the nozzle ends of each of the capsules 52.

The other output of source 146 is connected to a pulsing circuit 148 which receives the output of photoelectric sensing means 144 as a data input. The pulsed high voltage output of pulsing circuit 148 is connected to the inputs of four electronically actuated electronic switches 150 which are selectively closed in accordance with the output of a switch selector 152.

The outputs of each of the switches 150 are connected through block 78 to a different one of the contacts 82, 84, 86 and 88 which, in turn, are proximate conductive strips 70, 72, 74 and 76, respectively, on commutation disc 52. Arcuate sections of these conductive strips, in turn, are connected by leads 48 to the ends of the respective capsules 52 so as to actuate same when the appropriate conductive strip sections are energized. The actuation of capsules 52 result in the imprinting of dots on the paper.

Only four switch devices are required to control the actuation of all twenty print capsules. Because of the mechanical commutation device, each switch, in effect, operates one of the four capsules in each of the five capsule sets.

It will now be appreciated that the present invention is a high speed non-impact printing device which utilizes a rotary drum within which a plurality of sets of solid ink spark jet capsules are arranged in spaced relation around the circumference thereof. The number of electronically actuated electrical switches is greatly reduced through the use of a mechanical commutation device which includes a commutator disc which rotates with the drum. The disc has on its surface a plurality of concentric conductive strips divided into arcuate sections. The arcuate sections are situated in radially aligned groups corresponding to the capsules in each set. When the arcuate strips align with brushless contacts, they are selectively energized to actuate the individual capsules in the capsule set aligned with the paper to print dots thereon.

A single motor is utilized to rotate the drum and drive print speed and slew speed capstans, which alternately move the paper through the operation of a pair of electrically actuated solenoids. A strobe disc and photosensitive signal generating means cooperate in order to synchronize the pulsing of a high voltage source which, in turn, coordinates the actuation of the spark jet capsules with the rotational position of the drum.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims.

We claim:

1. A print head comprising a generally cylindrical member, a plurality of electrically actuatable solid ink spark jet capsules mounted in said member, means for rotating said member, high voltage electrical source means, contact means operably connected to said source means, and means spaced from and movable with said member relative to said contact means, operably electrically connected to said capsules, selected ones of said capsules being operably connected to said source as said member is rotated.

2. The head of claim 1, wherein said connecting means comprises a movable part having a conductive portion, contact means conditionally connectable with said source, said part being movable relative to said contact means between a non-aligned position and an aligned position, said contact means, when connected to said source, operably connecting same with said conductive portion when said conductive portion is aligned therewith.

3. The head of claim 2, wherein said part is a disc and wherein said disc is mounted for rotation with said member.

4. The head of claim 2, wherein said conductive portion comprises a substantially circular conductive strip on the surface of said disc.

5. The head of claim 4, wherein said conductive strip comprises a plurality of electrically isolated arcuate sections.

6. The head of claim 2, wherein said plurality of capsules are divided into sets, said sets being positioned at spaced locations around the circumference of the member.

7. The head of claim 6, wherein said conductive portion comprises a plurality of spaced conductive strips divided into electrically isolated sections.

8. The head of claim 7, wherein each of said sections correspond to one of the capsules in one of said sets.

9. The head of claim 6, wherein said conductive portion comprises a plurality of substantially concentric circular conductive strips on the surface of said disc.

10. The head of claim 9, wherein each of said conductive strips is divided into a plurality of electrically isolated sections.

11. The head of claim 10, wherein said sections are arranged in aligned groups.

12. The head of claim 11, wherein each of said groups of sections correspond to a different one of said sets of capsules.

13. The head of claim 1, further comprising means for driving a paper strip proximate the circumferential surface of said member.

14. The head of claim 13, wherein said driving means comprises a first capstan and a second capstan, said first capstan being adapted to move said paper strip at a first speed and said second capstan being adapted to move said paper strip at a second speed.

15. The head of claim 14, further comprising first and second pressure rollers, each being adapted, when moved to a given position, to cooperate with one of said first and second capstans, respectively, to move said paper strip and means for moving a selected one of said first and second pressure rollers to said given position.

16. The head of claim 14, wherein said rotating means drives said first and second capstans.

17. The head of claim 1, wherein said electrical source means comprises a high voltage source, means for pulsing the output of said source, and means for synchronizing said pulsing means with the rotation of said member.

18. The head of claim 1, wherein said source means has first and second outputs, one of said outputs being electrically connected to common terminal means mounted on the circumferential surface of said member, proximate the print ends of said capsules.

19. The head of claim 2, further comprising a common conductive portion aligned with said contact means at all positions of said member.

20. The head of claim 19, wherein said common conductive portion comprises an additional conductive strip.

21. The head of claim 20, wherein said additional conductive strip is undivided.

22. The head of claim 1, wherein said member comprises a drum with X sets of Y capsules each and said connecting means comprises a disc with Y spaced conductive portions arranged on the surface thereof, each portion divided into X sections, one undivided conductive portion, and X contacts each positioned to align with a different one of said portions.

23. The head of claim 22, further comprising means for selectively electrically connecting individual ones of said contacts with said source means.

24. The head of claim 23, wherein said contact connecting means comprises X switching means.

25. A print head comprising a generally cylindrical member, X sets of electrically actuatable solid ink spark jet print capsules positioned around the circumference of said member and comprising Y radially mounted capsules each, means for rotating said member, high voltage electrical source means, Y electrical switching means, mechanical commutator means operably electrically interposed between said switching means and said source for electrically connecting selected sets of said capsules with said source, as said member is rotated, said commutator means comprising brushless contact means and means mounted on and movable with said member spaced from said brushless contact means.

26. The head of claim 25, wherein said commutator means comprises Y brushless contact means connected to said switching means, respectively, and a disc mounted for movement with said member relative to said contact means, said disc having a surface, Y+1 conductive strips mounted on said surface, Y of said strips being divided into X electrically isolated sections each, each of said sections being connected to a different one of said capsules, each of said contacts being situated proximate a different one of said strips and adapted, when connected to said source means through the switching means connected thereto, to energize the section aligned therewith.

27. The head of claim 26, wherein said sections are divided into X groups, each of said X groups corresponding to a different one of said sets.

* * * * *